United States Patent Office 3,276,076
Patented Oct. 4, 1966

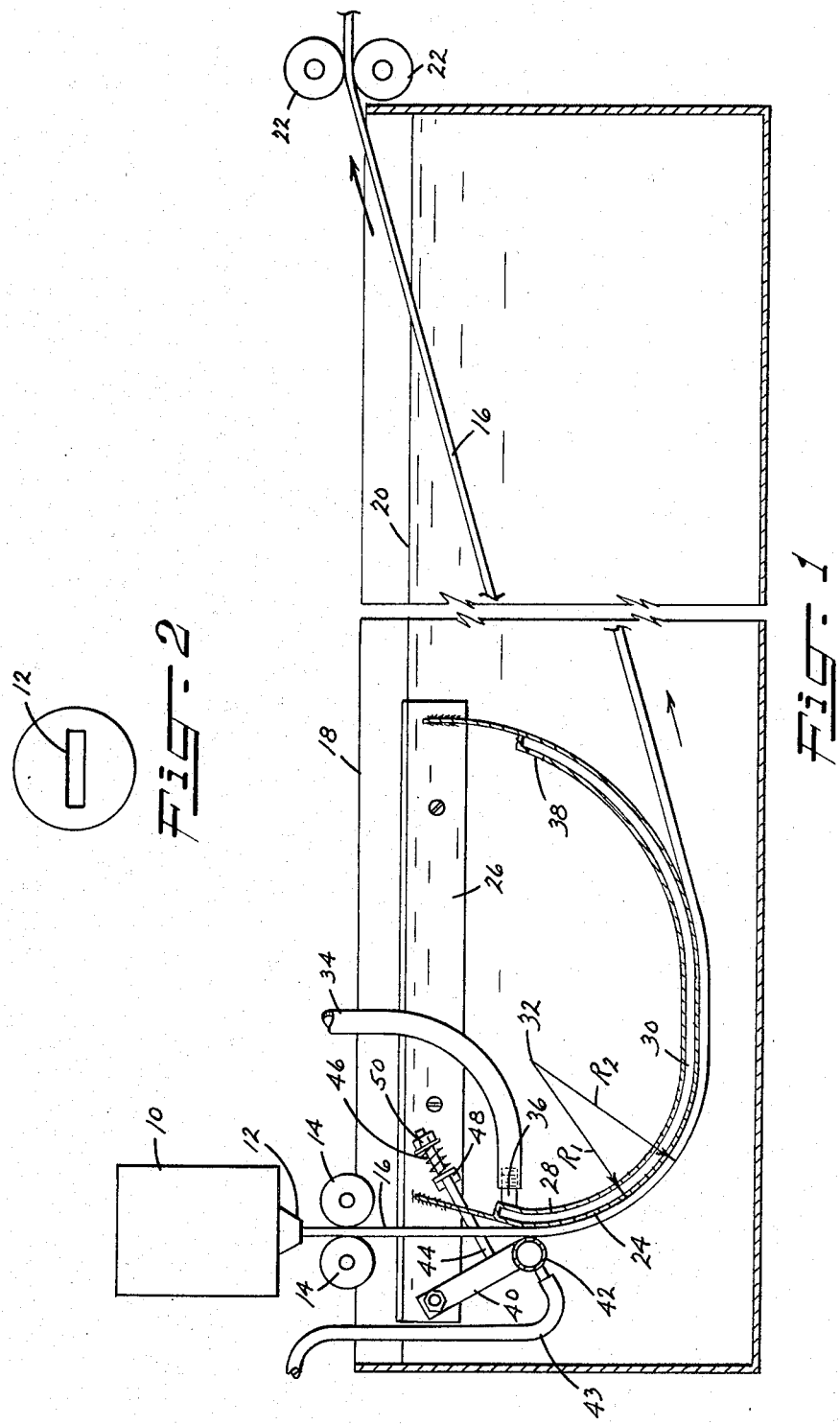

3,276,076
APPARATUS FOR MAKING THICK POLYMERIC ARTICLES
Daniel J. Ryan, Chester, and Leon F. Crockett, Green Ridge, Pa., assignors to FMC Corporation, Philadelphia, Pa., a corporation of Delaware
Filed May 27, 1965, Ser. No. 459,164
5 Claims. (Cl. 18—12)

This invention relates to apparatus for making relatively thick, indefinitely elongated polymeric articles of substantially rectangular cross section and especially to apparatus for forming such articles which are subsequently further elongated to produce longitudinal molecular orientation. In its more particular aspects, the invention relates to apparatus for producing high strength, oriented polymeric strapping useful as a substitute for steel band strapping.

The general procedure followed in manufacturing polymeric strapping comprises extruding the molten polymeric material (such for example as polypropylene) through a substantially rectangular die into a bath of cold water known as a quench bath, wherein the material is solidified to form an article having the appearance of a strap but which lacks great tensile strength. This article or strap is then subjected to stresses which substantially elongate the same and cause the molecules thereof to become oriented longitudinally. This orientation may be accomplished by stretching the strap or by rolling the same between rolls which cause it to elongate but prevent widthwise spreading. To minimize the amount of power required to elongate the strap, it is normally heated prior to orientation. As is well known, molecular orientation greatly increases the tenacity and tensile strength of the strap. The various operations of extruding, quenching, heating and orientation are carried out as a continuous process, the final product being collected in roll form of substantial length. An entire production line from the point of extrusion to the point of windup may be fifty feet or more long and economic reasons normally dictate that the line extend generally horizontally. This horizontal orientation applies also to the quench bath which may extend for ten feet or more in order to assure complete solidification of the strap interior. However, in order to permit easy access to the extrusion nozzle or die and avoid complicated design problems and custom built extrusion equipment, it is desirable to extrude the molten polymer in a vertically downward direction from a point somewhat above one end of the quench bath. Thus, in order for the strap to proceed to the far end of the quench bath it is necessary for it to make a turn at the forward end of the bath while the interior thereof is still in a highly plastic or at least not fully solidified condition. With a thin strap or sheet this initial turn in the forward end of the quench bath does not create any special problems but when the final oriented strap is over about twenty mils thick it does, as will be seen, and it is towards this area of the strap production apparatus that the present invention is directed.

While specific reference will be made herein to strapping and while the invention is particularly useful in making strapping or other molecularly oriented article, it also has utility in the production of heavy gauge polymeric articles such as sheeting which is not molecularly oriented.

It is an object of this invention to provide an improved apparatus for making a relatively thick polymeric article of substantially rectangular cross section.

A more specific object of the invention is to provide improved apparatus forming the initial portion of an oriented polymeric strap production line.

Still more specific objects of the invention will become apparent as the description of certain preferred embodiments thereof proceeds.

Referring now to the drawing:
FIG. 1 is a somewhat diagrammatic side elevational view of the apparatus; and
FIG. 2 is an end view of the extrusion die.

Since the invention is directed to that part of the operation that takes place prior to molecular orientation of the finished product (if indeed, a molecularly oriented product is to be produced) only that portion of the overall apparatus involving the extrusion die and quench bath has been shown. The molten polymer is extruded vertically downward from a conventional extruder 10 through a substantially rectangular die 12. After passing between opposed quenching and sizing rolls 14, the extrudate or article 16 falls into one end of a horizontally elongated tank 18 containing cold water, the level of which is indicated at 20. This is the quench bath and as previously mentioned it may extend for ten feet or more in order to permit complete solidification of the article as it passes therethrough. After entering the tank vertically, the article is drawn lengthwise through the bath in a substantially horizontal direction by a pair of feed rolls 22 from which it moves on through the molecular orientation apparatus or is immediately collected in those cases where molecular orientation is not desired or necessary. In the case of a thin film, the transition from the vertical to the substantially horizontal direction may be accomplished by passing it about a roller or the like but when the article is relatively thick, for example when the smaller dimension of die 12, this being the dimension determinative of the thickness of the article, is 0.06 inch or more, other means must be resorted to in order to attain an article of uniform thickness, as will presently be explained. At this point it might be mentioned that in the case of a high strength strap formed of polypropylene, the strap is elongated to about eight times its extruded length to obtain the desired degree of molecular orientation and to produce a strap having a thickness of 0.02 inch requires a die opening of 0.06 inch thickness.

Located within tank 18 is a curved sheet metal guide plate 24. Plate 24 extends substantially the full width of the tank and is held in position by being welded to strips 26, only one of which is shown, which strips in turn are secured to opposite side walls of tank. Secured to plate 24 is a sheet metal cover member 28 having a face parallel to plate 24, a closed space 30 being formed between plate 24 and the parallel face of the cover member. Guide plate 24 has a first segment which is an arc of a circle whose center is located at 32. This first segment has a point which is tangentially aligned with die 12 so that as the extrudate falls vertically into the tank it tangentially engages the face of the guide plate. At the lower end of the first segment the guide plate extends horizontally for a short distance and then curves in an upward direction. As the strap is pulled through the tank by the feed rolls 22, one face thereof slides against guide plate 24 as it changes direction from vertical to substantially horizontal.

The material forming the strap is of course quite hot when it enters the quench bath and without some means of dissipating the heat, guide plate 24 would be heated due to the heat transferred thereto by the hot strap. Since the outer face of the strap as it makes the turn is in direct contact with the bath water, uneven exterior cooling would result if the inner face were allowed to slide over the hot guide. To keep plate 24 cool, cold water is circulated through the space 30, the water being introduced through a hose 34 connected to a stem 36 secured in cover 28 and discharged through an opening 38 in the other end of the cover member. If desired, another hose may be connected to the opening 38, so that the water circulated through the space 30 is discharged outside the tank and not added to the bath water. The desired equal temperature of both faces of the strap can also be attained by making guide plate 24 in the form of a screen and eliminating the cover member 28. In this way the water of the bath is in direct contact with both sides of the strap.

In order to understand the value of the arrangement described herein, it should be borne in mind that when the article enters the quench bath it is in a highly plastic state and that the process of solidification begins with the formation of a skin around the outside of the article. The interior of the article does not reach full solidification until near the point where it emerges from the bath. As is apparent in the drawing, in making the turn in the the bath the inner radius $R_1$ and outer radius $R_2$ are somewhat different and the thicker the article the more noticeable this difference. It has been found that in the case of an article which is over about 0.06 inch thick at the time of making this turn, the outer surface thereof, that is the surface traveling around the radius $R_2$, will become rippled if the turn is made about a rotatable roller even when the roller is kept cool. This ripple effect is also produced with the device thus far described but the means for eliminating it will presently be described. The ripples extend across the strap and of course provide an article of uneven thickness. In the case of an oriented strap, the unequal thickness provided by the ripples is substantially eliminated by the orientation process but the strap is characterized by an undesirable striped appearance. The ripples apparently result from the longer path traveled by the outer face of the article about the radius $R_2$ while the interior is still in a highly plastic state. The exact cause of this phenomenon is not fully understood but it is undesirable and can be eliminated by the apparatus herein described.

Pivotally mounted on the strips 26 are a pair of arms 40, only one of which is shown, and extending between said arms is a non-rotatable pipe 42 having hoses 43, only one of which is shown, connected to opposite ends thereof whereby cold water may be circulated therethrough. A pin 44 is secured to arm 40 and a spring 46 surrounding said pin presses against a plate 48 secured to strip 26 and an adjustable stop 50 on the pin. Spring 46 swings arm 40 in the direction to cause pipe 42 to engage the outer face of the strap, preferably in alignment with the point where the inner face of the strap first engages the guide 24. The pipe 42 creates a drag on the skin of the outer face of the strap which, in combination with the drag on the inner face, results in the production of an article of uniform thickness. Instead of the spring loaded pipe 42, other means may be employed for slidably engaging the outer face to create the necessary drag. It might also be mentioned that pipe 42 or the equivalent serves an additional function of preventing the strap from moving away from guide plate 24 in those instances when the bath water is agitated, such agitation sometimes being necessary to insure a constant movement of the bath water with respect to the strap, in other words to prevent the water adjacent to the strap from moving along with the strap whereby the water is heated locally next to the strap even though the bath as a whole is cool.

Having thus described the invention, what is claimed is:

1. Apparatus for making a relatively thick polymeric article of substantially rectangular cross section comprising a downwardly directed substantially rectangular die through which a molten polymeric material is extruded, a water containing tank extending horizontally from a point beneath said die, a stationary curved guide located in said tank beneath the level of the water, said guide having a point tangentially aligned with said die whereby the extruded article falls into contact with said guide, means for pulling the article through the tank in a substantially horizontal direction, said means causing one face of the article to slide against said guide as the article changes direction from vertical to substantially horizontal, and means slidably engaging the other face of the article and pressing the article against the guide.

2. The apparatus set forth in claim 1 wherein the smaller dimension of said die is at least 0.06 inch.

3. The apparatus set forth in claim 1 comprising means for cooling said guide.

4. The apparatus set forth in claim 1 wherein said guide comprises a hollow sheet metal structure, and means for circulating water through said structure for cooling the same.

5. The apparatus set forth in claim 1 wherein said last mentioned means engages said article in alignment with the point where said article first engages said guide.

References Cited by the Examiner

UNITED STATES PATENTS

| 2,364,552 | 12/1944 | Reichel | 18—15 X |
| 2,452,884 | 11/1948 | Werner | 18—12 X |
| 2,545,868 | 3/1951 | Bailey | 18—12 X |
| 2,602,187 | 7/1952 | Sawler | 18—12 |

FOREIGN PATENTS 1,048,729  12/1953  France.

WILLIAM J. STEPHENSON, *Primary Examiner.*